(12) United States Patent
Birum et al.

(10) Patent No.: US 8,341,753 B2
(45) Date of Patent: Dec. 25, 2012

(54) MANAGING PRE-RELEASE OF A GAME APPLICATION OVER A NETWORK

(75) Inventors: Derrick Jason Birum, Duvall, WA (US); Erik Axel Johnson, Issaquah, WA (US); Christopher Richard Newcombe, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 1023 days.

(21) Appl. No.: 11/371,201

(22) Filed: Mar. 8, 2006

(65) Prior Publication Data

US 2006/0236090 A1    Oct. 19, 2006

Related U.S. Application Data

(60) Provisional application No. 60/662,162, filed on Mar. 10, 2005.

(51) Int. Cl.
*H04L 29/06* (2006.01)

(52) U.S. Cl. ........... 726/27; 726/1; 726/2; 726/3; 726/4; 726/5; 726/10; 726/26; 726/28; 726/29; 726/30; 713/165; 713/166; 713/167; 713/189; 713/193; 380/200; 380/203; 380/259; 380/263; 380/277; 380/278; 380/279; 380/28; 380/29; 380/30; 705/50; 705/51; 705/56; 705/57; 705/59

(58) Field of Classification Search .................. 713/150, 713/182–185, 155–159, 170–173, 175, 164–168, 713/189–194, 2, 26–30; 380/251, 255, 277–30, 380/200–204, 259–263; 726/1–33; 705/50–59
See application file for complete search history.

(56) References Cited

U.S. PATENT DOCUMENTS 5,708,709 A * 1/1998 Rose ............................... 705/59
5,784,460 A * 7/1998 Blumenthal et al. ............ 705/51
(Continued)

FOREIGN PATENT DOCUMENTS

WO    WO 0146782 A2 *    6/2001

OTHER PUBLICATIONS

Secure Production of Digital Media by Steinebach et al; Publisher: Springer-Verlag; Date: Jan. 27, 2005.*

(Continued)

*Primary Examiner* — Taghi Arani
*Assistant Examiner* — Madhuri Herzog
(74) *Attorney, Agent, or Firm* — Frommer Lawrence & Haug LLP; John W. Branch

(57) ABSTRACT

A system, method, and apparatus are arranged to enable loading of an application, such as a game application, prior to a formal release date of the application. An end-user is provided components of the application either over a network, CD, DVD, or the like. At least one component of the application is encrypted. The end-user may register with an application provider. At a pre-defined time, such as a release date for the application, a decryption key is made available to the end-user. The decryption key may be employed to decrypt the encrypted component(s) of the application, such that the application may be readied for execution. In addition, bug fixes, additions, or the like, may also be pre-loaded to release of the application, thereby ensuring that the end-user has the most current application configuration.

21 Claims, 3 Drawing Sheets

U.S. PATENT DOCUMENTS

| | | | | |
|---|---|---|---|---|
| 6,973,499 | B1* | 12/2005 | Peden et al. | 709/229 |
| 7,103,574 | B1* | 9/2006 | Peinado et al. | 705/51 |
| 7,409,061 | B2* | 8/2008 | Newcombe | 380/251 |
| 7,426,637 | B2* | 9/2008 | Risan et al. | 713/165 |
| 7,484,103 | B2* | 1/2009 | Woo et al. | 713/189 |
| 2003/0172270 | A1* | 9/2003 | Newcombe et al. | 713/168 |
| 2004/0133794 | A1* | 7/2004 | Kocher et al. | 713/193 |
| 2005/0154682 | A1* | 7/2005 | Taylor | 705/71 |

OTHER PUBLICATIONS

Watermarking to Track Motion Picture Theft by Bloom et al; Publisher: IEEE; Year: 2004.*

Kohl, J. and Neuman, C., "The Kerberos Network Authentication Service (V5)", RFC 1510, 129 pages, Sep. 1993.

Swift, M., et al., "Microsoft Windows 2000 Kerberos Change Password and Set Password Protocols", RFC 3244, 107 pages, Feb. 2002.

Raeburn, K., "Encryption and Checksum Specifications for Kerberos 5", RFC 3961, 7 pages, Feb. 2005.

Raeburn, K, "Advanced Encryption Standard (AES) Encryption for Kerberos 5", RFC 3962, 47 pages, Feb. 2005.

Neuman, C., et al., "The Kerberos Network Authentication Service (V5)", RFC 4120, 15 pages, Jul. 2005.

* cited by examiner

MANAGING PRE-RELEASE OF A GAME APPLICATION OVER A NETWORK

CROSS-REFERENCE TO RELATED APPLICATIONS

The present application claims priority from Provisional Application Ser. No. 60/662,126 entitled "System and Method for Managing Pre-Release of a Game Application Over a Network," filed on Mar. 10, 2005, the benefit of the earlier filing date of which is hereby claimed under 35 U.S.C. §119 (e) and 37 C.F.R. §1.78, and which is further incorporated by reference.

FIELD OF THE INVENTION

The present invention relates generally to managing content over a network and more particularly, but not exclusively, managing pre-release applications over a network.

BACKGROUND OF THE INVENTION

Today's applications, and in particular, some of today's game applications may be very large, sometimes in the gigabytes. Such large applications may take a considerable amount of time to download to a client device over a network. In addition, these large applications may take considerable time to load off of a computer readable medium such as a Compact Disc (CD), Digital Video Disc (DVD), or the like.

However, there is a desire in the game industry to be able to provide such applications to an end-user prior to its release. Providing a game application prior to release enables the game industry to foster interest in the game, and to enable early loads of the game application by the end-user. The intent of an early load is to minimize time to prepare the game for execution when it is finally available, post release. In addition, application providers may desire the capability of trickling the game application out to a customer base over an extended period of time before a release, and thereby reduce loads on their servers. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

Figure 1:
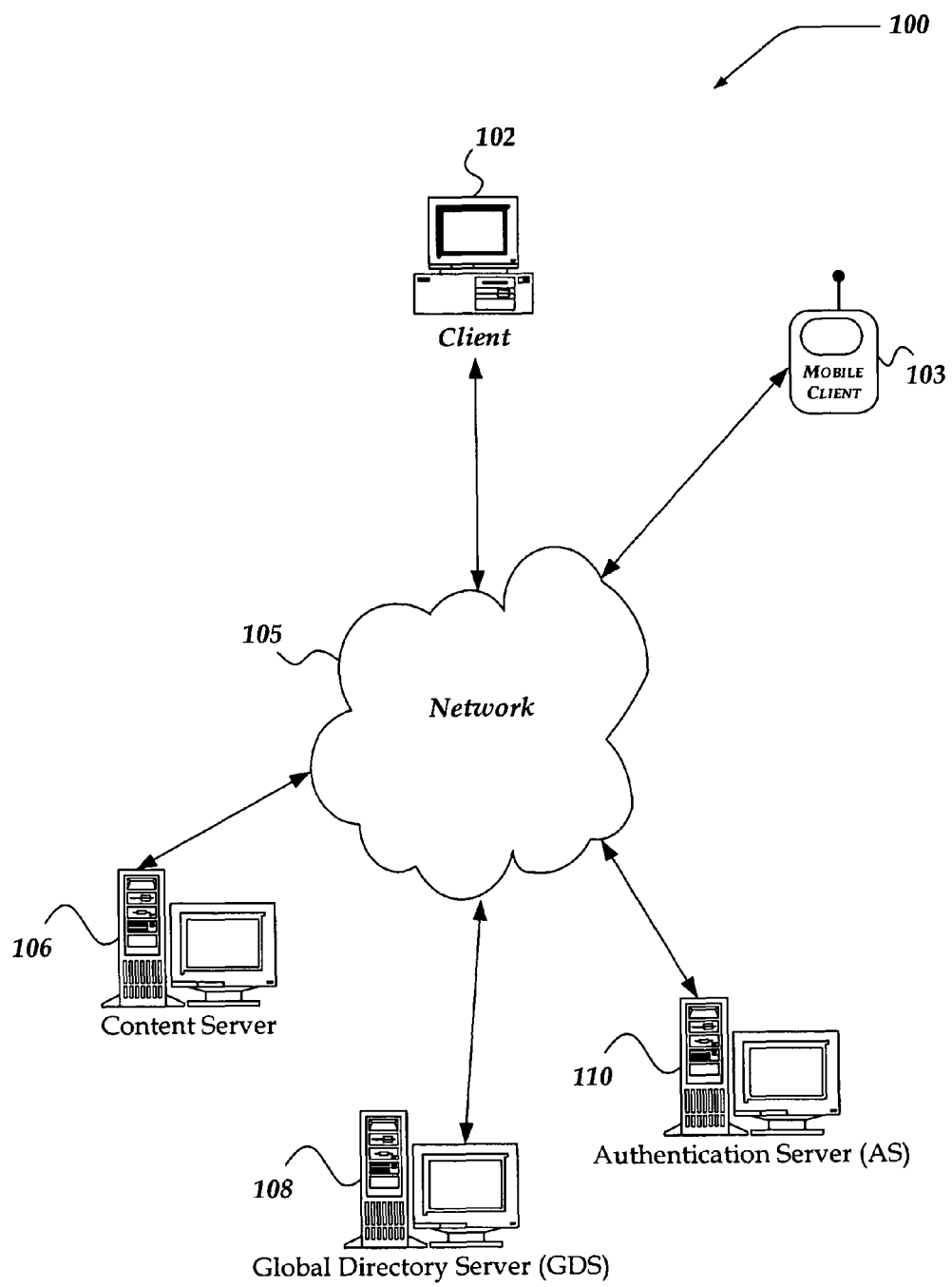
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the invention is directed to a system, method, and apparatus arranged to enable loading of an application, such as a game application, by an end-user prior to formal release date of the application. An end-user is provided components of the application either over a network, and/or through a computer-readable medium, such as a CD, DVD, Blu-Ray discs, HD-DVD, or the like. Other useable computer-readable mediums include various portable memory devices such as USB flash drives, memory cards, or the like. At least one component of the application is encrypted. Providing the components, including at least one encrypted component, on a physical medium further enables an application provider to distribute the pre-release application through a variety of channels, including a retail channel. This approach may further enhance customer interest in the application.

As used herein, a formal release date is that date on which the application provider publishes or otherwise makes available the application to the public. In one embodiment, the formal release date is identified by an announcement of the availability of the application. In one embodiment, a release date is a formal release date.

The end-user may load the components onto their computing client device. The end-user may further register with an application provider to be able to use the application when it is released for use. At a pre-defined time, such as a release date for the application, a decryption key is made available to the end-user. In one embodiment, the decryption key is made available to the end-user through an update to an application file, such as a content description record, or the like. The decryption key may then be employed to decrypt the encrypted component(s) of the application, such that the application may be readied for execution. Readying for execution may include, for example, installing and configuring application components on the end-user's client device.

The present invention enables the end-user to pre-load components of the application at a time prior to release of the application by the application provider, such that the application components are readily available at time of release. Pre-loading of the application components using the present invention, however, is performed in a manner that inhibits execution of the application prior to its release. In addition, bug fixes, additions, and the like, may also be pre-loaded by the end-user prior to release of the application, thereby ensuring that the end-user has the most current application configuration.

Illustrative Operating Environment

FIG. 1 illustrates a block diagram generally showing an overview of one embodiment of a system in which the present invention may be practiced. As shown in the figure, system 100 includes clients 102-103, content server 106, Authentication Server (AS) 110, Global Directory Server (GDS) 108, and network 105. System 100 may include many more components than those shown in FIG. 1. However, the components shown are sufficient to disclose an illustrative embodiment for practicing the present invention.

Generally, clients 102-103 may include virtually any computing device capable of receiving and sending a message over a network, such as network 105, and the like, to and from another computing device, and for executing an application, such as a game application. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, clients 102-103 also may be any computing device that is capable of connecting using a wired or wireless communication medium such as a PDA, POCKET PC, laptop computer, wearable computer, and any other device that is equipped to communicate over a wired and/or wireless communication medium.

Clients 102-103 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), extensible Markup Language (XML), Dynamic HTML (DHTML), and so forth.

Clients 102-103 may further include a client application that enables it to perform a variety of other actions, including, communicating a message, such as through a Short Message Service (SMS), Multimedia Message Service (MMS), instant messaging (IM), internet relay chat (IRC), Mardam-Bey's IRC (mIRC), Jabber, email service, and the like, between itself and another computing device.

Clients 102-103 also may include at least one client application that is configured to receive content from another computing device, such as components of an application from content server 106. However, the invention is not so limited. For example, clients 102-103 may also receive components of an application using any of a variety of computer-readable mediums, including CDs, DVDs, memory cards, or the like.

Clients 102-103 may be configured to store the received components for later use. In one embodiment, clients 102-103 may receive components of an application, such as a game application. At least one component of the application is encrypted. Moreover, the received components may be associated with an application that is in a "pre-release" mode. That is, the components of the application may be available to an end-user for early loading onto a computing device, but not for full execution, or the like. That is, a subset of the application may be configured for almost immediate execution by clients 102-103. One example might include a client application component of the application useable to enable registration with the application provider. Moreover, the remaining components of the application may at some subsequent time, however, be reconfigured, ready for execution. The subsequent time may be known as a release date, and is typically provided by the application provider.

In one embodiment, clients 102-103 may also receive pre-release components from the application provider that include bug fixes, additional features, and the like, for the application. In this manner, clients 102-103 may have the latest configuration of the application when it becomes available for release and execution.

The client application may further enable clients 102-103 to register with the application provider to enable execution of the application, when the application is released. Registration may be performed using any of a variety of mechanisms. For example, an end-user of clients 102-103 may employ an authentication identifier, such as a CD-key, or the like, to authenticate and register itself for execution of the application. In one embodiment, clients 102-103 may be authenticated through AS 110, and registered to execute the application through GDS 108, content server 106, or the like. Clients 102-103 may further employ a process, such as described below in conjunction with FIG. 3, to perform at least some of the above actions.

Network 105 is configured to couple one computing device and its components with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 105 may include virtually any wireless and/or wired communication mechanism by which information may travel between computing devices, another network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of content server 106 is described in more detail below in conjunction with FIG. 2. Briefly, however, content server 106 may include any computing device capable of connecting to network 105 to manage delivery of components of an application, such as a game application. In addition, content server 106 may also be configured to enable an end-user, such as an end-user of clients 102-103, to decrypt and execute the application. For example, content server 106 may provide at a pre-defined time, such as a release date for the application, a decryption key for use in decrypting at least one component of the application on clients 102-103. In one embodiment, content server 106 may provide the decryption key to clients 102-103 through a file, application component, or the like. For example, content server 106 may employ a content description record to provide the decryption key. However, the invention is not so limited, and the decryption key may be made available to clients 102-103 upon the pre-defined time, using virtually any mechanism, including sending the decryption key to clients 102-103 within an encrypted file.

AS 110 is configured to authenticate an end-user, such as an end-user of clients 102-103, and to provide the authenticated user one or more content tickets that enables the authenticated user to access one or more content servers (106). AS 110 may or may not be located in a single physical location. AS 110 may use any of a variety of mechanisms to authenticate the end-user, including a CD-key, a password, or the like. AS 110 may further employ any of a variety of mechanisms to provide the authenticated end-user the content tickets, including Kerberos, or the like. Moreover, components of the system may be distributed and connect to network 105 at different points.

Content server 106 may include virtually any electronic device capable of storing content and sending the content to a requesting device. Content managed by content server 106 includes data, applications, licensing information, and the like. In one embodiment, the content includes components of a game application. The components may be compressed, encrypted, or unencrypted. In one embodiment, at least one component of the game application is encrypted. Content may be sent to requestors in a compressed, encrypted, or unencrypted format. Moreover, content may be packaged into blocks of data. Associated with the blocks may also be a checksum block. The checksum block provides integrity information associated with the blocks of data. The checksum block may also be in a compressed, encrypted, or unencrypted format.

Content server 106 may authenticate clients 102-103 that send a content ticket that was granted by AS 110. The content ticket may include a client readable portion and a server readable portion. The portions may be encrypted such that only entities that have the correct encryption/decryption keys can read each portion.

Content server 106 is also configured to read its portion of the content ticket to verify whether the sending client should be enabled access to the requested content. In one embodiment of the invention, the client's IP address is included in the content ticket. In another embodiment, the client's CD-key is provided. As part of its authentication, content server 106 may validate that a request is coming from a certain IP address identified in the content ticket.

Content server 106 is further configured to invalidate content tickets. For example, when a user logs onto a new client, content tickets that are associated with a prior client may be invalidated to prevent simultaneous use, misuse, or the like.

GDS 108 is configured to provide location information about AS 110, content server 106, and the like, to clients 102-103, and/or content server 106. GDS 108 may also receive location information from AS 110, content server 106, and the like. In one embodiment, the location information includes an IP address. Location information may also include a Universal Resource Locator (URL), Media Access Control (MAC) address, and the like. In one embodiment, clients 102-103 may communicate with GDS 108 to obtain location information for AS 110, content server 106, or the like.

Devices that may operate as AS 110, content server 106, and/or GDS 108 include personal computers, desktop computers, multiprocessor systems, microprocessor-based or programmable consumer electronics, network PCs, servers, and the like.

Moreover, although AS 110, content server 106, and GDS 108 are described as distinct servers, the invention is not so limited. For example, one or more of the functions associated with these servers may be implemented in a single server, distributed across a peer-to-peer system structure, or the like, without departing from the scope or spirit of the invention.

Illustrative Server Environment

Figure 2:
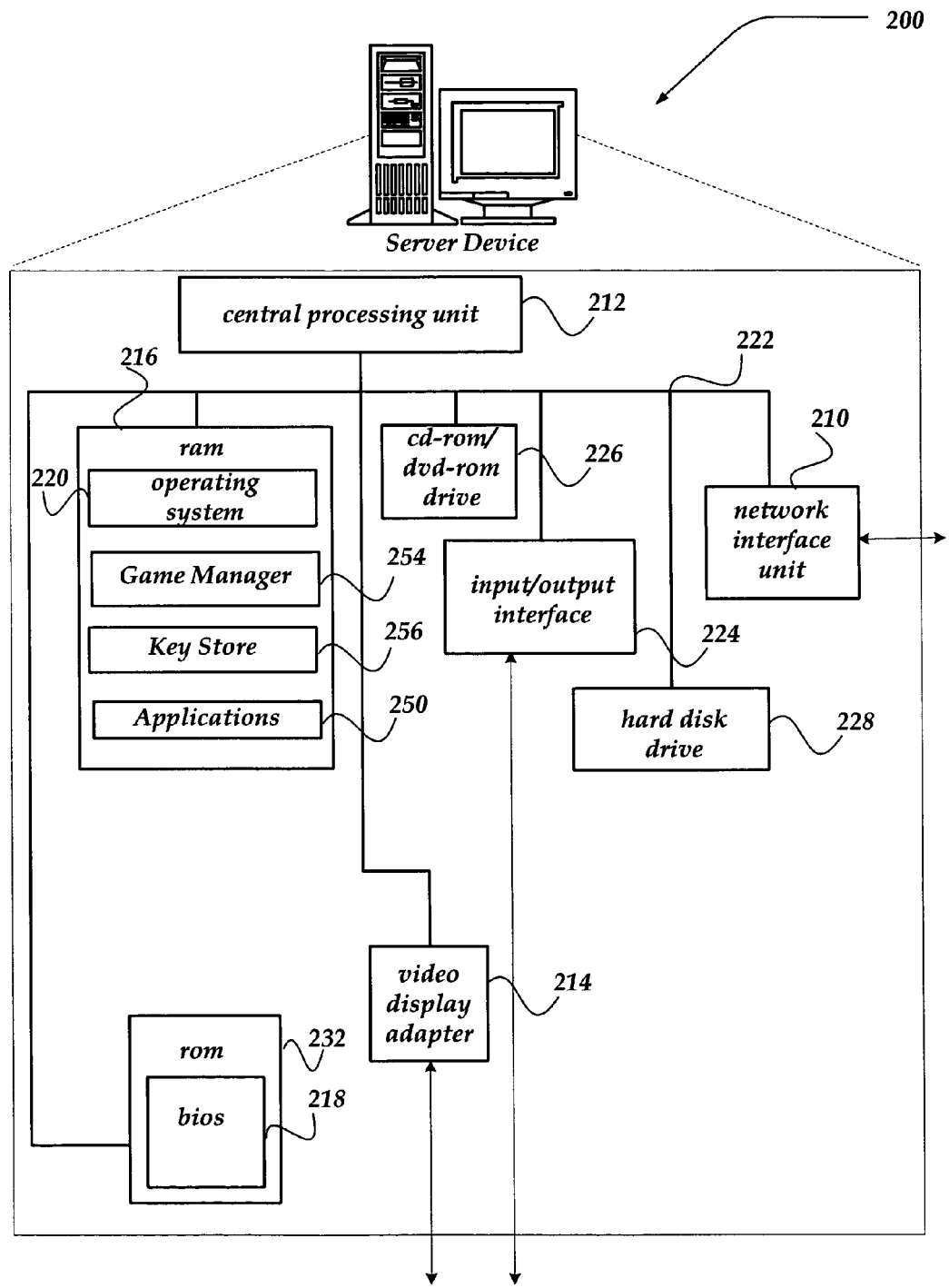
FIG. 2 shows one embodiment of a server device for use in managing a pre-release of an application.

FIG. 2 shows one embodiment of a server device, according to one embodiment of the invention. Server device 200 may include many more components than those shown. The components shown, however, are sufficient to disclose an illustrative embodiment for practicing the invention. Server device 200 may be employed for example as content server 106 of FIG. 1.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server device 200. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 also includes input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server device 200 to store, among other things, application programs, databases, messages, predefined (default actions) associated with a postmark, a postmark, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, and so forth. Mass storage may further include applications such as game manager 254, and key store 256.

Briefly, game manager 254 is configured to manage delivery of content, including components of the application, to a client device, such as clients 102-103 of FIG. 1. Typically game manager 254 may provide components to a pre-release application, such as a game application to the client device over a network. At least one of the components provided is encrypted using any of a variety of encryption mechanisms. For example, in one embodiment of the invention, Crypto++, an open-source class library of cryptographic techniques, is employed in encrypting or decrypting components of the application. However, virtually any other encryption and decryption mechanism, including open source, commercial, and/or proprietary may be used, including Advanced Encryption Standard (AES), RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, Blum-BlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and the like.

Game manager 254 may further provide updated application components to clients 102-103 as appropriate. Game manager 254 may provide components that are pre-release mode, as well as components post release.

Game manager 254 may further request a content ticket or other authentication from a client device that is requesting content. Game manager 254 may employ the content ticket, or the like, to confirm that the client device is authorized to receive components of the application. In one embodiment, game manager 254 may provide pre-release components of the application to a client that is not authenticated. This may occur because the application includes at least one component that is encrypted such that the complete application is unable to execute until it is unencrypted. However, the client may still be able to execute at least a portion of the application on the client before all of the application is available on the client, or the encrypted portion is unencrypted.

Game manager 254 may also store a decryption key in key store 256. Key store 256 may include virtually any storage mechanism for storing and managing decryption keys, including a file, a database, a spreadsheet, and the like.

The decryption key may be useable to decrypt at least one encrypted component. In one embodiment, the decryption key is generic, such that each encrypted component may be decrypted. In another embodiment, at least one other encrypted component is decrypted using another decryption key, such that the client must employ at least two decryption keys for the application. In one embodiment, the other decryption key is unique to a client. For example, the unique decryption key may be associated with a client's IP address, a CD-key, or the like.

Game manager 254 is configured to provide at least one decryption key to a client device upon a pre-defined time, such as a release date. Game manager 254 may make the decryption key(s) available using any of a variety of mechanisms. For example, upon the release date, game manager 254 may provide the decryption key(s) to a client that is registered and ready to start the application. Game manager 254 may receive an indication that the client is ready to start the application, and in response, may provide the decryption key(s) by updating a content description record with the decryption key for use by the client. The content description record may be provided to the client over a network, for example. The client device may then employ the decryption key(s) to decrypt at least one component and complete installation of the application. The client may then be enabled to execute the application.

After the release date, game manager 254 may elect to provide components to requesting clients with at least one component being encrypted. Alternatively, game manager 254 may elect to provide the components unencrypted.

Generalized Operation

Figure 3:
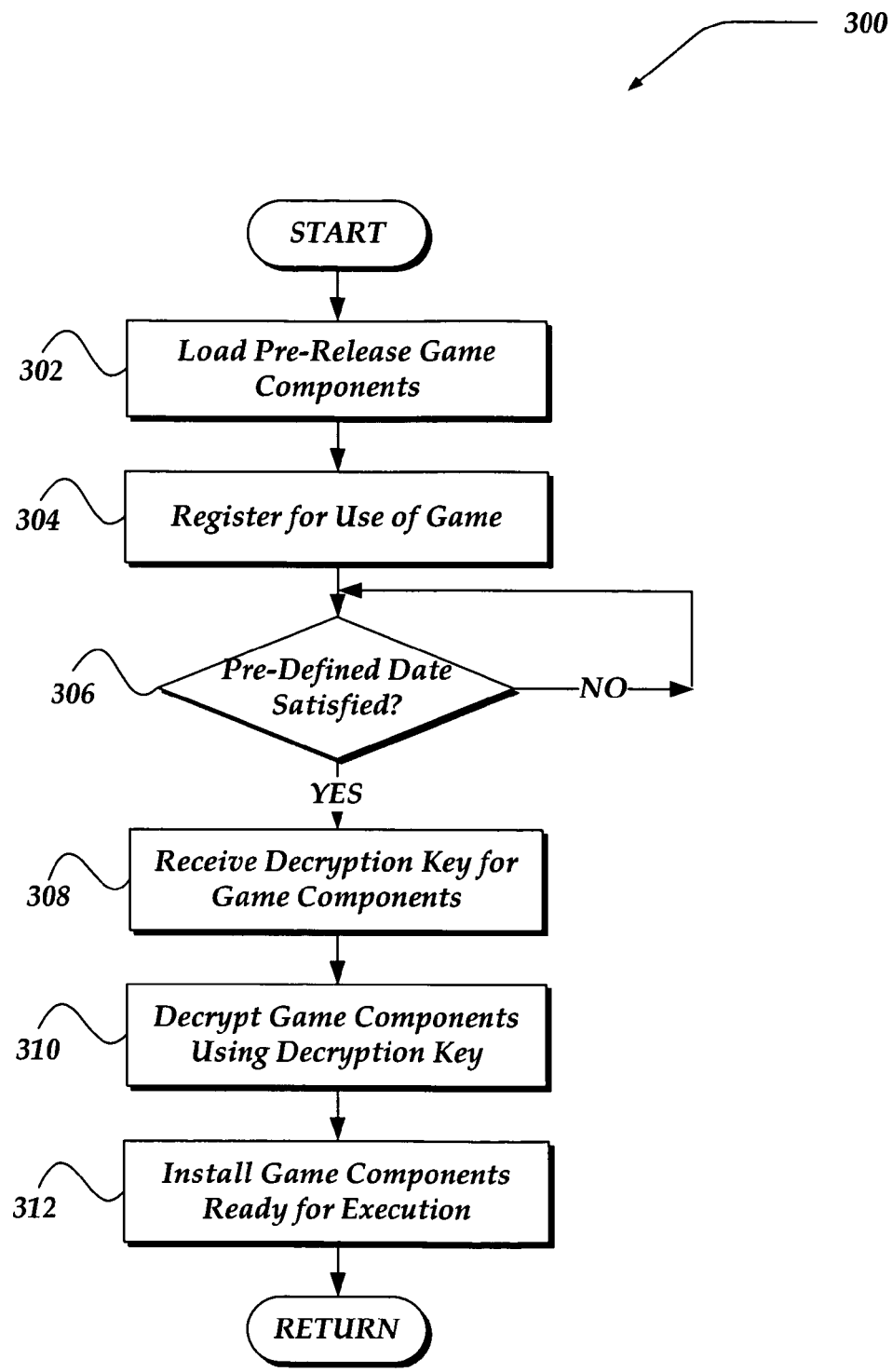
FIG. 3 illustrates a flow chart for one embodiment of a process of managing a pre-release of an application, such as a game application, over a network, in accordance with the invention.

The operation of certain aspects of the invention will now be described with respect to FIG. 3. FIG. 3 illustrates a process where a received message is assigned a postmark. The process of FIG. 3 may be employed, for example, by clients 102-103 of FIG. 1.

Process 300 of FIG. 3 begins, after a start block, at block 302, where a client device, such as clients 102-103 loads pre-release components of an application, such as components of a game application. In one embodiment, at least one component of the game application is encrypted. The pre-release components may be received over a network, such as network 105 of FIG. 1. The pre-release components may also be loaded from a CD, DVD, or similar physical medium. The physical medium may have been obtained through traditional retail channels, friends, or the like, thereby encouraging early interest by a client.

Processing continues next to block 304 where an end-user of the client device may register for use of the game application. Registration may include providing information to an authentication server, or the like, for use in registering the end-user. The authentication server may receive the information and provide a content ticket, or other information to the client device. Moreover, the client device may be enabled to install and execute a subset of the game components before all of the game components are available on the client in an unencrypted form. For example, in one embodiment, the client device may be enabled to load and install for execution a client application component that communicates with servers associated with the game provider to enable further execution of the application after the application is released.

Processing flows next to decision block 306, where a pre-defined time is monitored. In one embodiment, the pre-defined time is a release date for when the game application is considered available for play. Monitoring of the pre-defined time may be performed by a client application on the client device, an application on a server associated with the game provider, or a combination of both the client application and the application on the game provider's server. In any event, if the pre-defined time has not occurred, processing loops back around to continue monitoring for the time. During this monitoring phase, however, additional components may be made available for downloading to the client device. These additional components may, for example, include bug fixes, additional features, enhancements, and the like, to the game application. Some of the additional components may also be encrypted. Moreover, some of the additional components may replace components already residing on the client device.

If, at decision block 306, it is determined that the pre-defined time is satisfied, processing continues to block 308, where the client device is provided the decryption key(s) for use in decrypting the encrypted application components. In one embodiment, the decryption key(s) are made available to the client device from server that is configured to provide an updated file, such as a content description record, or the like. As stated above, in one embodiment, the pre-defined time is a release date. Satisfaction of the release date (or other pre-defined time) arises when today's date is equal to or is chronologically more recent than the release date (or other pre-defined time. In one embodiment, a comparison of dates may be based on a month, day, and year time stamp. In another embodiment, a comparison of dates may be based on a month, day, year, and hour, minute, and even second time stamp. Thus, for example, in one embodiment, satisfaction of the release date may occur when at least the month, day, and year are the same.

As noted, at block 308, the decryption keys are made available to the client device if the pre-defined time is satisfied. However, it may actually be some period of time after the pre-defined time that the client device actually receives the decryption keys. This may arise for a variety of reasons, including the mechanism used to make the decryption keys available. For example, an email may be sent to the client device indicating that the decryption keys are available. In this case, the email may be delayed due to the server providing the email delivery may not be actually read at the client device for some time, or the like. Therefore, the user of the client device may not actually retrieve and use the decryption keys for some period beyond the pre-defined time. Moreover, the client device may be constrained from using the decryption key for a variety of other reasons, including, but not limited to an externally controlled release date, such as one that a service provider might provide, or the like.

Processing proceeds next to block 310, where the decryption key(s) are employed to decrypt the encrypted application components. Processing continues to block 312, where the decrypted application components are employed to install the application ready for execution by a registered end-user's client device. Process 300 then returns to a calling process to perform other actions, such as enabling the application to execute over a network, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus useable in managing an application delivery over a network, comprising:
   a network interface component for receiving and sending information;
   a processor, in communication with the network interface component, that includes machine instructions that cause the processor to perform operations, including:
      receiving from a client device a request for at least a portion of the application, wherein the application is executable by the client device;
      determining if the request is authentic, and if so, then providing a content ticket that includes a first portion encrypted to be readable only by the client device and a second portion encrypted to be readable only by a content server device and an IP address associated with the client device, the content ticket being useable to allow the client device to access at least the portion of the application prior to a release date associated with the application;
      in response to receiving a valid content ticket, providing at least the portion of the application prior to the release date associated with the application, wherein at least one component of the application within the portion is encrypted using an encryption key, a different component of the application within the portion is encrypted using a different encryption key, and at least one subset of other components of the application within the portion is unencrypted and executes on the client device prior to the release date of the application and before every component of the application for the client device is available after the release date for execution on the client device; and
      if the release date associated with the application is satisfied, sending a decryption key to decrypt the at least one component that is encrypted and a different decryption key to decrypt the different component that is encrypted such that each component of the application for the client device, including at least each component that is decrypted, are enabled for execution on the client device.

2. The apparatus of claim 1, wherein authenticating the request for content further comprises authenticating the request based on at least one of a CD-key, or a password.

3. The apparatus of claim 1, further comprising:
   invalidating the content ticket if it is determined that another request using the content ticket is received from a second client device different from the client device.

4. The apparatus of claim 1, wherein providing the decryption key further comprises providing the decryption key within a content description record.

5. The apparatus of claim 1, wherein providing at least a portion of the application prior to the release date further comprises providing the portion using at least one of a network, a CD, a DVD, a Blu-Ray disc, an HD-DVD, or a portable memory device.

6. The apparatus of claim 1, further comprising:
   providing at least an other portion of the application at least prior to the release date, the other portion comprising at least one of a bug fix, or an enhancement to the pre-released portion of the application.

7. A method of managing delivery of an application over a network, comprising:

receiving from a client device a request for at least one component of the application, wherein the application is executable by the client device;

determining if the request is authentic, and if so, then providing a content ticket that includes a first portion encrypted to be readable only by the client device and a second portion encrypted to be readable only by a content server device and the IP address of the client device, the content ticket being useable to allow the client device to access at least the at least one component of the application prior to a release date associated with the application;

upon receipt of a valid content ticket, providing, to the client device, at least pre-released components of the application prior to the release date for the application, wherein at least one pre-released component of the application is encrypted to inhibit execution of the at least one pre-released component prior to the release date, wherein the at least one pre-released component of the application is encrypted using a first encryption key and a second pre-released component of the application is encrypted using a second encryption key, and at least one subset of other pre-released components of the application is executable by the client device prior to the release date for the application; and if the release date associated with the application is satisfied, providing at least a first decryption key and a second decryption key for use in decrypting at least the first and the second pre-released encrypted components that are encrypted using the first and the second encryption keys, wherein each component of the application for the client device is enabled to execute on the client device.

8. The method of claim 7, further comprising:
providing at least one of a bug fix, or an enhancement to the application prior to the release date.

9. The method of claim 7, further comprising:
registering an end-user of the client device; and
providing, to the client device, the content ticket being useable to enable access to at least the first and the second decryption keys.

10. The method of claim 7, further comprising:
invalidating the content ticket if it is determined that another request using the content ticket is received from a second client device different from the client device.

11. The method of claim 7, wherein the content ticket further comprises an Internet Protocol (IP) address associated with the client device.

12. A client device that is configured for use in receiving an application over a network, comprising:
a processor; and
memory in communication with the processor useable in storing data and machine instructions that causes the processor to perform actions, including:
sending a request for at least a portion of a pre-release of the application, wherein the application is executable by the client device;
in response to the request being determined to be authentic, receiving a content ticket that includes a first portion encrypted to be readable only by the client device and a second portion encrypted to be readable only by a content server device and an IP address associated with the client device, the content ticket being useable to allow the client device to access at least the portion of the application prior to a release date associated with the application;
in response to sending the content ticket, receiving the pre-release of the application, wherein the pre-release comprises a subset of components of the application, including: at least one component being encrypted using an encryption key, a different component being encrypted using a different encryption key, and at least one subset of other components that is unencrypted and executes on the client device prior to a release date of the application and before every component of the application for the client device is available for execution on the client device;
after the release date for the application, receiving a decryption key and a different decryption key;
employing the decryption key to decrypt the at least one component of the application that is encrypted and the different decryption key to decrypt the different component that is encrypted; and
enabling each component of the application for the client device, including the at least one component that is decrypted and the different component that is decrypted, to execute on the client device.

13. A server that is configured for use in providing an application over a network, comprising:
a transceiver to send and receive data over the network; and
a processor that is operative to perform actions comprising:
receiving from a client device a request for at least a portion of the application, wherein the application is executable by the client device;
determining if the request is authentic, and if so, providing a content ticket that includes a first portion encrypted to be readable only by the client device and a second portion encrypted to be readable only by a content server device and an IP address associated with the client device, the content ticket being useable to allow the client device to access at least the portion of the application prior to a release date associated with the application;
in response to receiving a valid content ticket, providing components of an application over the network prior to the release date, at least one of the components being encrypted using an encryption key and a different component being encrypted using a different encryption key, while at least one subset of other components is unencrypted and enabled to execute prior to the release date and prior to providing another component of the application; and
if the release date is detected, sending a decryption key to decrypt the at least one component and the different component that are encrypted and such that each component of the application for the client device, including at least the components that are decrypted, are enabled for execution by the client device.

14. The server of claim 13, the actions further comprising:
providing at least one update to the components of the pre-released components of the application prior to the release date.

15. The server of claim 13, wherein sending the decryption key further comprises sending the decryption key to an authenticated client.

16. The server of claim 13, the actions further comprising:
authenticating the client device using at least one of a CD-key or a password; and
providing the authenticated client device with the content ticket configured to enable the client device to obtain another component of the application.

17. The server of claim 13, the actions further comprising:
receiving the content ticket from a client device;
examining the content ticket to determine if the content ticket is associated with the client device; and if the content ticket is unassociated with the client device, invalidating the content ticket and inhibiting access to the decryption key.

18. A system useable in managing delivery of a game application, comprising:
- an authentication server that includes program code operative to perform actions, including:
  - performing authentication of an end-user;
  - providing an authenticated end-user with a content ticket that includes a first portion encrypted to be readable only by a client device and a second portion encrypted to be readable only by a content server device, and wherein the content ticket is unique to the client device; and
- a content server that includes program code operative to perform actions, including:
  - enabling delivery of at least a portion of the game application prior to a release date associated with the game application, wherein the game application is executable by the client device, and wherein at least one component in the portion is encrypted using an encryption key, a different component in the portion is encrypted using a different encryption key, and at least one subset of other components in the portion of the game application is unencrypted and executes prior to the release date and before every component of the game application for the client device is available for execution at the client device of the end-user;
  - authenticating a request for at least another portion of the game application based, in part, on the content ticket; and
  - if the release date is detected, enabling the authenticated end-user to decrypt the at least one component and the different component such that each component of the game application for the client device is available for execution.

19. The system of claim 18, wherein enabling the authenticated end-user to decrypt the at least one component using the decryption key.

20. An apparatus useable in managing access to an application, comprising:
- a processor that is operative to perform actions comprising:
  - receiving from a client device a request for at least at least one component of the application, wherein the application is executable by the client device;
  - determining if the request is authentic, and if so, providing a content ticket that includes a first portion encrypted to be readable only by the client device and a second portion encrypted to be readable only by a content server device and an IP address associated with the client device, the content ticket being useable to allow the client device to access at least the at least one component of the application prior to a release date associated with the application;
  - providing to the client device components of the application prior to the release date for the application, wherein at least one component of the application is inhibited from execution prior to the release date and wherein at least one subset of other components of the application is unencrypted and executes prior to the release data and prior to all of the components of the application being available on the client device, wherein at least one inhibited component of the application includes an encrypted component of the application and a different encrypted component of the application; and
- means for enabling execution of each component of the application, including the at least one inhibited component, after detection of having satisfied the release date.

21. The method of claim 7, further comprising:
if the release date associated with the application is satisfied, providing at least a second decryption key for use in decrypting the second pre-released component, wherein the second decryption key is unique to the client device.

* * * * *